(No Model.)
J. J. McTIGHE.
ELECTRIC LAMP.
No. 258,240.  Patented May 23, 1882.
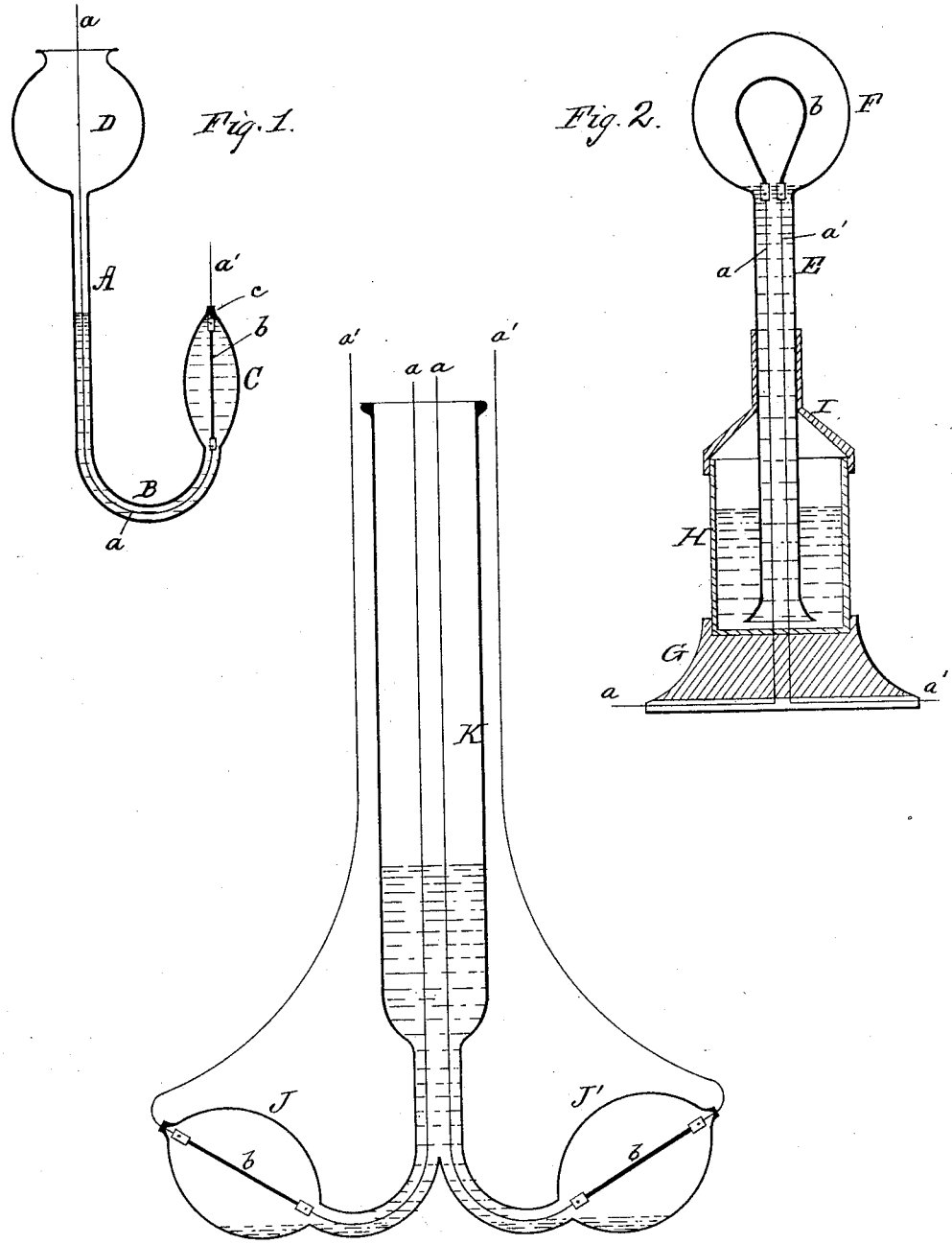
WITNESSES:
Thomas J. Patterson
Saml. Cunningham
James J. McTighe INVENTOR,
Connolly Bros & McTighe,
ATTORNEYS

UNITED STATES PATENT OFFICE.

JAMES J. McTIGHE, OF PITTSBURG, PENNSYLVANIA.

ELECTRIC LAMP.

SPECIFICATION forming part of Letters Patent No. 258,240, dated May 23, 1882.

Application filed September 5, 1881. (No model.)

*To all whom it may concern:*

Be it known that I, JAMES J. McTIGHE, of Pittsburg, in the county of Allegheny and State of Pennsylvania, have invented certain new and useful Improvements in Electric Lamps; and I do hereby declare that the following is a full, clear, and exact description of the invention, which will enable others skilled in the art to which it appertains to make and use the same, reference being had to the accompanying drawings, which form a part of this specification, and in which—

Figures 1, 2, and 3 are vertical sections of different forms of my invention.

This invention relates to electric lamps of the incandescent form, and has for its object to produce an oxygenless atmosphere in the globe to maintain the same, and to reintegrate the carbon as fast as it disintegrates from the act of incandescence.

The invention consists in inclosing the incandescing conductor in a globe, which is then filled with a vaporizable liquid which contains no oxygen in combination; further, in providing for the expansion into vapor of such liquid, while excluding the atmospheric air; further, and specifically, in inclosing a carbon-burner in a vessel or globe filled with hydrocarbon liquid, free to expand, while excluding the atmospheric air; and, finally, in a lamp embodying the foregoing inventions.

In the drawings, Fig. 1, I take a tube, A, of glass, recurve it at B, and at the end of the curve form a bulb, C, and form an enlarged or pouring cup, D. Bulb C at its top is opened slightly. Through the opening in bulb C, I insert the wire $a$, to which is clamped the carbon-burner $b$, and to this in turn is clamped the wire $a'$. Then I can seal the bulb at $c'$ first, and afterward fill with the liquid, or fill first up to point $c$ and then seal. The liquid must be one in which there is no oxygen in combination. In the carbon-lamp I use a hydrocarbon liquid, such as olive-oil, or purified and refined petroleum or other oil. The lamp thus finished is as shown in Fig. 1. Upon admission of the current to the lamp-circuit the burner $b$ becomes heated, parts with some of its heat to the liquid, which vaporizes, and the expanding vapor drives the liquid through the bend B upwardly in tube A until the bulb C is free from oil and contains a vapor free from oxygen. Then the burner $b$ becomes incandescent and produces the light, the heat meantime being sufficient to preserve the vapor in a state of expansion, and preventing the return of the liquid. When the current is cut off, heat being no longer produced, the burner $b$, globe C, and its contained vapor cool, and the contraction or condensation of the vapor permits the liquid to re-enter the bulb C. This, in the case of a carbon-burner, $b$, and a hydrocarbon liquid, causes the carbon to become saturated with the hydrocarbon, which, upon relighting the lamp, carbonizes, and thus compensates for any disintegration which may have taken place in the burner $b$. In this manner the burner is preserved in an oxygenless atmosphere without the trouble and expense of a vacuum-pump, and the carbon-lamp is automatically renewed as fast as it disintegrates.

In Fig. 2 I show another form. A tube, E, is formed with a bulb, F, at its upper end, the lower end being open. In this I insert the burner $b$, clamped to the wires $a\ a'$. I then invert the tube E and fill it with a hydrocarbon liquid—olive-oil, for example. A base, G, carries a cup, H, containing the same oil. When tube E is full I restore it to an upright position (preventing the escape of its contained oil) and insert it in the cup H, after which a suitable clamp or bracket, I, may be attached to unite the whole. As in the mercurial barometer, the column of liquid in E will be sustained after the production of a slight vacuum in the bulb F. Upon the passage of current the lamp acts the same as that shown in Fig. 1, but is more quickly responsive to the heat. The lamp is shown in operation in Fig. 2.

Fig. 3 shows a two-light chandelier constructed on the same principles. It has the bulbs J J', each communicating with the central reservoir, K. Bulbs J J' have respectively the burners $b$ and the wires $a\ a'$, wires $a$ passing up through the reservoir K, and wires $a'$ emerging from the bulbs J J', as shown. A surplus of oil is held by the reservoir K. Any oil lost by evaporation can be readily replaced at the reservoir.

Such a lamp is most readily constructed, is exceedingly cheap, and will last indefinitely almost. While I describe particular forms of lamp, I by no means limit myself to such.

I claim as my invention—

1. The method of producing and maintaining an oxygenless atmosphere in electric lamps, consisting in inclosing the burner in a suitable globe, filling said globe with a vaporizable liquid devoid of oxygen, sealing the globe with said liquid, and finally passing the current through the burner, substantially as described, whereby the liquid is vaporized by the heat in the burner, and access of oxygen to the globe is prevented by the liquid seal.

2. The method of renewing or reintegrating a carbon electric-lamp burner by submerging it in a hydrocarbon liquid in a globe or vessel, excluding the atmospheric air therefrom, and then alternately admitting current to the burner and shutting it off therefrom, substantially as described, whereby the first admission of current to the burner heats and vaporizes the liquid, the following cessation of current allows the vapor to condense and saturate the burner, and the next admission of current again vaporizes the liquid and cokes the burner, and so on.

3. In incandescent carbon electric lamps, the combination of a containing-globe communicating at one end with the external atmosphere, a burner and its leading-wires, and a liquid hydrocarbon contained in said globe and sealing its open end, substantially as described.

In testimony that I claim the foregoing as my own I have hereto affixed my signature in presence of two witnesses.

JAMES J. McTIGHE.

Witnesses:
T. J. McTIGHE,
THOMAS J. PATTERSON.